United States Patent Office 3,644,397
Patented Feb. 22, 1972

3,644,397
SUBSTITUTED 2-AMINOMETHYLPYRROLES
Stephen Raines, Plymouth Meeting, Pa., and Csaba A. Kovacs, Hyattsville, Md., assignors to Richardson-Merrell Inc., New York, N.Y.
No Drawing. Filed Nov. 12, 1968, Ser. No. 775,145
Int. Cl. C07d 27/26
U.S. Cl. 260—326.3
7 Claims

ABSTRACT OF THE DISCLOSURE

Compounds having the generic formula:

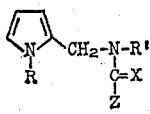

wherein R and R' may be hydrogen or lower alkyl; X may be either oxygen or sulfur; and Z may be lower alkyl, lower alkoxy, phenyl, halophenyl, alkoxyphenyl, benzyl, anilino, lower alkylamino, cyclohexylamino, or phenylacetoxymethyl, have useful pharmacological properties as central nervous system depressants. The compounds are prepared by reacting the desired substituted 2-aminomethylpyrrole with acid chlorides or anhydrides, isocyanates, isothiocyanates, or chloroformates to give the desired amide, urea, thiourea, or carbamate derivative.

---

This invention relates to new compounds having useful pharmacological properties and to methods for the preparation of such compounds.

The compounds of this invention are derivatives of substituted 2-aminomethylpyrroles. They have the generic formula:

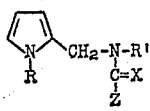

wherein R and R' may be hydrogen or lower alkyl; X may be either oxygen or sulfur; and Z may be lower alkyl, lower alkoxy, phenyl, halophenyl, alkoxyphenyl, benzyl, anilino, lower alkylamino, cyclohexylamino, or phenylacetoxymethyl.

The novel derivatives of the substituted 2-aminomethylpyrroles of this invention may be prepared by the following reactions. The initial reaction is

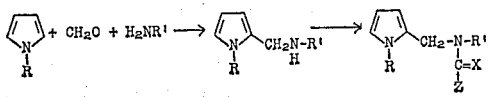

which is the well known Mannich reaction. The novel derivatives are obtained by reacting the resulting substituted 2-aminomethylpyrroles with acid chlorides or anhydrides, isocyanates, isothiocyanates, and chloroformates to give amides, ureas, thioureas, and carbamates, respectively.

Where acid chlorides and chloroformates are employed in the preparation of amides and carbamates, an acid acceptor such as triethylamine is utilized. The reaction conditions usually involve the use of inert solvents, preferably benzene, at temperatures between 10° C. to 30° C.

Where isocyanates and thioisocyanates are employed in the preparation of ureas and thioureas, the reactions are also carried out in an inert solvent, preferably benzene, at room temperature.

The compounds of this invention showed marked central nervous system (CNS) depressant activity with a wide therapeutic index. The compound of greatest activity was N - ethyl - N - (pyrrol - 2 - ylmethyl)acetamide which had a minimal symptomatic dose of 31 mg./kg. per os in mice while the minimal lethal dose was 2000 mg./kg. per os. The profile of depression appears to be similar to the phenothiazinetranquilizers and the therapeutic index approximates that of the Librium-Valium like compounds. Pharmacologically, the compounds of this invention have potentially useful therapeutic applications as central nervous system depressants.

EXAMPLE 1

N-phenyl-N'-methyl-N'-(pyrrol-2-ylmethyl)urea

To a solution of 2-(methylaminomethyl)pyrrole (5.5 grams, 0.05 mole) and benzene (150 ml.), phenylisocyanate (6.0 grams, 0.05 mole) in benzene (50 ml.) was carefully added and let stand for sixteen hours. The solvent was removed under reduced pressure and the resulting oil was crystallized by the use of a petroleum ether-ether mixture followed by recrystallization from additional solvent mixture. The product had a melting point of 79° C. to 81° C. and was obtained in a yield of 48 percent (5.5 grams).

When this compound was administered orally to male mice weighing between 18 to 30 grams, at a dosage level of 125 mg./kg. of body weight, it was observed that these mice developed in four minutes a marked decrease in curiosity, decreased spontaneous motor activity, marked bradypnea and apnea which lasted for fifty minutes. At oral dosages of 500 mg./kg. of body weight, additional physiological responses such as moderate decrease in muscle tone, moderate to marked somnolence, marked analgesia, and decreased response to noise was observed.

When 2-(methylaminomethyl)pyrrole is used with the following isocyanates or isothiocyanates:

n-butylisocyanate
n-butylisothiocyanate
phenylisothiocyanate
cyclohexylisocyanate in the above procedure, the compounds listed below are obtained, respectively:

N-n-butyl-N'-methyl-N'-(pyrrol-2-ylmethyl)urea (melting point 43° C. to 45° C.)
N-n-butyl-N'-methyl-N'-(pyrrol-2-ylmethyl)thiourea (melting point 54° C. to 55° C.)
N-phenyl-N'-methyl-N'-(pyrrol-2-ylmethyl)thiourea (melting point 132° C. to 134° C.)
N-cyclohexyl-N'-methyl-N'-(pyrrol-2-ylmethyl)urea (melting point 105° C. to 107° C.)

When 2-(ethylaminomethyl)pyrrole is used with phenylisocyanate or phenylisothiocyanate in the above procedure, the following compounds are obtained:

N-phenyl-N'-ethyl-N'-(pyrrol-2-ylmethyl)urea (melting point 87° C. to 89° C.)
N-phenyl-N'-ethyl-N'-(pyrrol-2-ylmethyl)thiourea (melting point 96° C. to 98° C.)

while 2-(n-propylaminomethyl)pyrrole and 1-methyl-2-(methylaminomethyl)pyrrole in the presence of phenylisocyanate give, respectively:

N-phenyl-N'-n-propyl-N'-(pyrrol-2-ylmethyl)urea (melting point 123° C. to 125° C.)
N-phenyl-N'-methyl-N'-(1-methylpyrrol-2-ylmethyl)urea (melting point 129° C. to 131° C.)

EXAMPLE 2

N-methyl-N-(pyrrol-2-ylmethyl)benzoylamide

To an ice cooled and stirred solution of 2-(methylaminomethyl)pyrrol (11.0 grams, 0.1 mole), triethylamine (30.4 grams, 0.3 mole), and benzene (300 ml.) under nitrogen, a solution of benzoyl chloride (14.1 grams, 0.1 mole) in benzene (100 ml.) was added dropwise over a two hour period. The reaction mixture was stirred for six hours and let stand overnight. The triethylamine hydrochloride formed was extracted from the benzene solution by washing with water (200 ml.). The organic layer was dried over sodium sulfate, filtered, followed by concentration under reduced pressure. The resulting oil was solidified with the aid of cyclohexane and recrystallized from ether. The product had a melting point of 87° C. to 89° C. and was obtained in a yield of 59 percent (12.7 grams).

At oral dosages of 125 mg./kg. of body weight, mice began to develop within five minutes slight dyspnea and bradypnea, moderate decreased spontaneous motor activity, decreased curiosity, gasping for air, low body posture, and belly dragging. The duration of these symptoms lasted for about thirty minutes. At 500 mg./kg. of body weight, various symptoms such as marked ataxia, spread eagle walknig, a marked lacrimation, and slight to no mydriasis were observed.

Where 2-(methylaminomethyl)pyrrole is used with the following acid chlorides:

p-chlorobenzoyl chloride
p-fluorobenzoyl chloride
3,4,5-trimethoxybenzoyl chloride
phenacyl chloride
2-phenyl-2-acetoxyacetyl chloride
ethyl chloroformate in the above procedure, there are obtained the compounds listed below, respectively:

N-methyl-N-(pyrrol-2 - ylmethyl) p-chlorobenzoylamide (melting point 146° C. to 147° C.)
N-methyl-N-(pyrrol-2-ylmethyl) p-fluorobenzoylamide (melting point 141° C. to 143° C.)
N-methyl-N-(pyrrol-2-ylmethyl) 3,4,5-trimethoxybenzoylamide (melting point 122° C. to 124° C.)
N-methyl-N-(pyrrol-2-ylmethyl) phenacylamide (melting point 87° C. to 89° C.)
N-methyl-N-(pyrrol-2-ylmethyl) 2-phenyl-2-acetoxyacetamide (melting point 117° C. to 119° C.)
Ethyl N-methtyl-N-(pyrrol-2-ylmethyl) carbamate (oil)

Where 2-(ethylaminomethyl)pyrrole is used with benzoyl chloride, the compound

N-ethyl-N-(pyrrol-2-ylmethyl)benzoylamide (melting point 58° C. to 60° C.)

is obtained, while 2-(n-propylaminomethyl)pyrrole and 1-methyl-2-(methylaminomethyl)pyrrole in the presence of p-chlorobenzoyl chloride gave, respectively:

N-n-propyl-N-(pyrrol-2-ylmethyl) p-chlorobenzoylamide (melting point 59° C. to 61° C.)
N-methyl-N-(1-methylpyrrol-2-ylmethyl) p-chlorobenzoylamide (melting point 55° C. to 57° C.)

EXAMPLE 3

N-ethyl-N-(pyrrol-2-ylmethyl)acetamide

To an ice cooled and stirred solution of 2-(ethylaminomethyl)pyrrole (12.4 grams, 0.1 mole) and benzene (300 ml.) under nitrogen, acetic anhydride (10.2 grams, 0.1 mole) in benzene (200 ml.) was added in a dropwise manner. After stirring for twelve hours, the reaction was extracted with two 100 ml. portions of a 10 percent sodium hydroxide solution and 100 ml. of water. The benzene layer was dried over sodium sulfate, filtered, followerd by concentration under reduced pressure. A yellow solid was obtained which gave pure product after washing with n-hexane. The product had a melting point of 67° C. to 69° C. and was obtained in a yield of 75 percent.

At dosage levels of 125 mg./kg. of body weight administered orally, the mice showed marked decrease in curiosity and spantaneous motor activity, marked bradypnea, marked apnea, marked vocalization, and marked somnolence. At dosage levels of 31.5 mg./kg. of body weight, the observed effects were slight to moderate decrease in curiosity, spontaneous motor activity, and apena—which effects began within about five minutes and lasted for approximately ten minutes.

Where 2-(methylaminomethyl)pyrrole and 2-(n-propylaminomethyl)pyrrole are reacted with acetic anhydride, the following compounds are obtained, respectively:

N-methyl-N-(pyrrol-2-ylmethyl)acetamide (melting point 74° C. to 76° C.)
N-n-propyl-N-(pyrrol-2-ylmethyl)acetamide (melting point 46° C. to 48° C.)

What is claimed is:

1. A compound having the formula:

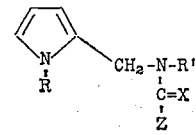

wherein R and R′ may be hydrogen or lower alkyl; X may be either oxygen or sulfur; and Z may be lower alkoxy, anilino, lower alkylamino, cyclohexylamino, or phenylacetoxymethyl.

2. A compound of claim 1 which is N-phenyl-N′-methyl-N′-(pyrrol-2-ylmethyl)urea.
3. A compound of claim 1 which is N-n-butyl-N′-methyl-N′-(pyrrol-2-ylmethyl)urea.
4. A compound of claim 1 which is N-cyclohexyl-N′-methyl-N′-(pyrrol-2-ylmethyl)urea.
5. A compound of claim 1 which is N-phenyl-N′-ethyl-N′-(pyrrol-2-ylmethyl)urea.
6. A compound of claim 1 which is N-phenyl-N′-n-propyl-N′-(pyrrol-2-ylmethyl)urea.
7. A compound of claim 1 which is N-phenyl-N′-methyl-N′-(1-methylpyrrol-2-ylmethyl)urea.

References Cited

Herz et al. Chem. Abs. vol. 52: 352c (1958).
Troszkiewicz et al. Chem. Abs. vol. 63: 11285h (1965).
Noller, Chemistry of Organic Compounds (1965), p. 259.

ALEX MAZEL, Primary Examiner

J. A. NARCAVAGE, Assistant Examiner

U.S. Cl. X.R.

260—326.9; 424—274